United States Patent
Zhang et al.

(10) Patent No.: US 6,678,172 B1
(45) Date of Patent: Jan. 13, 2004

(54) SELF-DRIVING CIRCUIT FOR A DC/DC CONVERTER

(75) Inventors: Xingzhu Zhang, Shenzhen (CN); Xiaopeng Dong, Shenzhen (CN)

(73) Assignee: Emerson Network Power Co., Ltd., Shenzhen (CN)

( * ) Notice: Subject to any disclaimer, the term of this patent is extended or adjusted under 35 U.S.C. 154(b) by 0 days.

(21) Appl. No.: 10/169,239

(22) PCT Filed: Nov. 1, 2000

(86) PCT No.: PCT/CN00/00413
§ 371 (c)(1), (2), (4) Date: Jun. 26, 2002

(87) PCT Pub. No.: WO01/50581
PCT Pub. Date: Jul. 12, 2001

(30) Foreign Application Priority Data

Dec. 30, 1999 (CN) .......................... 99127192 A

(51) Int. Cl.[7] .............................. H02M 3/335
(52) U.S. Cl. ................... 363/21.14; 363/127
(58) Field of Search ............... 363/20, 21.01, 363/21.12, 21.14, 81, 84, 89, 125, 127

(56) References Cited

U.S. PATENT DOCUMENTS

| | | | |
|---|---|---|---|
| 5,343,383 A | * 8/1994 | Shinada et al. | 363/127 |
| 5,400,239 A | 3/1995 | Caine | |
| 6,084,792 A | * 7/2000 | Chen et al. | 363/127 |
| 6,195,270 B1 | * 2/2001 | Wittenbreder | 363/17 |
| 6,438,009 B2 | * 8/2002 | Assow | 363/127 |
| 6,459,595 B2 | * 10/2002 | Assow | 363/21.14 |
| 6,563,719 B1 | * 5/2003 | Hua et al. | 363/21.06 |
| 6,563,725 B2 | * 5/2003 | Carsten | 363/127 |
| 6,583,993 B2 | * 6/2003 | Hua | 363/21.06 |
| 6,597,592 B2 | * 7/2003 | Carsten | 363/127 |

FOREIGN PATENT DOCUMENTS

EP     0 954 088 A1    11/1999

* cited by examiner

Primary Examiner—Adolf D. Berhane
(74) Attorney, Agent, or Firm—Ladas & Parry

(57) ABSTRACT

The present invention provides a self-driving circuit for DC/DC converter of a low voltage, high current, and high power density. The converter comprises a transformer, output rectification portion $SR_1$ and voltage clamping. The first configuration of the self-driving circuit consists of resisters $R_{a1}$, $R_{a2}$, capacitors $C_{a1}$, $C_{a2}$, transistors $Q_{a1}$, $Q_{a2}$; and the second configuration consists of Da, small power MOS transistor SRa, an auxiliary winding Nsa, a delay driving circuit and a isolating differential circuit. The self-driving circuit of the present invention may reduce the cross-conductive loss, and increase the converting efficiency.

17 Claims, 9 Drawing Sheets

US 6,678,172 B1

SELF-DRIVING CIRCUIT FOR A DC/DC CONVERTER

The present invention relates to a self-driving circuit for a DC/DC converter of low voltage, high current, and high power density.

With the rapid development of high technologies, such as, communications, remote sensing, electronic computers, and electronic instrument, the requirement of power supplies of such electronic equipment has increased accordingly. DC/DC converter of low voltage, high current, and high power density is the core technology of the power supplies for supper integrated circuits and high-speed central processors. To meet high efficiency and high power density requirement, the auxiliary (secondary) side of such DC/DC converters shall use synchronous rectifying MOSFET transistor in place of Schottky diode for rectification in order to reduce power loss. However, for a synchronous rectifying MOSFET, the gate thereof needs a corresponding drive circuit to stimulate. In order to prevent cross-conductive losses, the requirement of time sequence of the drive circuit is very high. The existing drive circuits utilize external driving technology, but its control is too complicated and the cost is high.

For a converter having only one synchronous rectifying MOSFET at the secondary side, such as a backward stimulating circuit, the synchronous rectifying MOSFET cannot be driven directly by the waveform of the secondary side of the transformer. Otherwise, the transistor would be damaged for failure to shut down. For instance, FIG. 1a shows a traditional backward stimulating circuit. The voltage waveform of its secondary side is shown in FIG. 1b. If such a waveform of the secondary side is used to drive the gate of $SR_1$, as shown in FIG. 2, $SR_1$ may hardly be turned off owing to $V_{gs1}=V_o$, and there will be short-circuit in the secondary side to cause losses when S turns on.

If an external auxiliary winding is used for self-driving, the converting efficiency may reduce dramatically because it is hard to control the cross-conducting time. The efficiency is normally lower than that of using Schottky diode. For instance, FIG. 3 shows a self-driving circuit using an external auxiliary winding Nsa to drive $SR_1$. When S turns off and the secondary side voltage changes to positive at top and negative at bottom, $SR_1$ turns on, and the energy of the secondary side of the transformer will be provided to the load through $SR_1$; when S turns on, S and $SR_1$ may be on at the same time because it will need sometime for the secondary side voltage to change to negative at bottom and positive at top such that the secondary side would be short-circuited. Although this time is relatively short, its cross-conductive loss is rather high. If serious, it may damage S and $SR_1$. Even under the normal operation, the converting efficiency can hardly be increased. Therefore, to improve the converting efficiency, the self-driving circuit should be modified.

Therefore, the object of the present invention is to solve the existing problem in the self-driving circuit of the main circuit of a DC/DC converter of low voltage and high current, and to provide a self-driving circuit for the converter that has reduced cross-conductive loss, simple structure, and low cost.

The present invention is realized through the following technical embodiments. In the first configuration of the self-driving circuit of the DC/DC converter of the present invention, the rectification portion of the converter comprises a synchronous rectifying MOS transistor ($SR_1$), wherein the self-driving circuit is composed of two resisters ($R_{a1}$, $R_{a2}$), two capacitors ($C_{a1}$, $C_{a2}$), a PNP transistor ($Q_{a1}$) and a NPN transistor ($Q_{a2}$). The resister ($R_{a1}$) and the capacitor ($C_{a1}$) are connected in parallel, and an end of the parallel connection of the register ($R_{a2}$) and capacitor ($C_{a2}$) connected with the base of the transistor (Qa) and the other end connected with an end of parallel connected resister ($R_{a2}$) and capacitor ($C_{a2}$), and with the positive end of the transformer winding (Ns) and the drain end of the rectifying MOS transistor ($SR_1$). The other end of the parallel connection of the resister ($R_{a2}$) and capacitor ($C_{a2}$) is connected with the base end of the transistor ($Q_{a2}$). The emitter of the transistor ($Q_{a2}$) is connected with the source end of the MOS transistor ($SR_1$), while its collector is connected the collector of the transistor ($Q_{a1}$) and the gate of the MOS transistor ($SR_1$). The emitter of the transistor ($Q_{a1}$) is connected with the negative end of the winding (Ns).

In the second configuration of the self-driving circuit of the DC/DC converter of the present invention, the rectification portion of the converter comprises a synchronous rectifying MOS transistor ($SR_1$), wherein the self-driving circuit is composed of a diode (Da), a small power MOS transistor (SRa), an auxiliary winding (Nsa), a time delay driving circuit, and an isolating differential circuit. The delay driving circuit and the isolating differential circuit are connected with each other. An end of the isolating differential circuit is connected with the gate of the small power MOS transistor SRa. The positive end of the auxiliary winding (Nsa) is connected with the source end of the small power MOS transistor (SRa) and the source end of the synchronous rectifying MOS transistor ($SR_1$), while its negative end is connected with the anode of the diode Da. The cathode of the diode Da is connected with the gate of the synchronous rectifying MOS transistor ($SR_1$) and the drain end of the small power transistor (SRa).

The isolating differential circuit may be composed of the windings ($N_{pa1}$) and ($N_{pa2}$) of the transformer, two capacitors, two resisters, and a diode. The winding $N_{sa1}$ is connected, through the capacitor, with the parallel-connected resister and diode.

The time delay driving circuit is composed of a delay circuit and a driving circuit, wherein an example of the delay circuit is formed by connecting the diode and resister in parallel, and then connected in serial to a ground capacitor.

The DC/DC converter is a double backward converter including windings (Np, Ns) and power MOS transistors ($S_1$, $S_2$). The positive end of the winding (Np) is connected with the source end of the power MOS transistor ($S_1$), and the negative end of the winding (Np) is connected to the drain end of the power MOS transistor ($S_2$). The delay driving circuit is connected with the gates of the power MOS transistors ($S_1$) and ($S_2$), respectively.

The DC/DC converter is a clamping backward converter of three windings (Nc, Np, Ns), including the windings (Nc, Np, Ns), power MOS transistor (S) and diode (Dc). The negative end of the winding (Np) is connected with the drain end of the power MOS transistor (S), and the positive end of the winding (Nc) is connected with the cathode of the diode (Dc). The delay driving circuit is connected with the gate of the power MOS transistor (S).

The DC/DC converter is a R.C.D. clamping backward converter including windings (Np, Ns), a power MOS transistor (S), a resister (Rc), a diode (Dc) and a capacitor (Cc). The negative end of the winding (Np) is connected with the drain end of the power MOS transistor (S). The delay driving circuit is connected with the gate of the power MOS transistor (S), and the negative end of the winding Np is connected with the anode of the diode (Dc). An end of the parallel-connected capacitor (Cc) and resister (Rc) is connected with the cathode of the diode (Dc), while the other end is connected with the positive end of the winding (Np).

The DC/DC converter is an active clamping backward converter including windings (Np, Ns), power MOS transistors (S, Sc) and a capacitor (Cc). The positive end of the winding (Np) is connected through the capacitor (Cc) with the drain end of the power MOS transistor (Sc). The source end of the power MOS transistor (Sc) is connected with the drain end of the power MOS transistor (S) and the negative end of the winding (Np). The delay driving circuit is connected with the gate of the power MOS transistor (S).

The converter is a diode clamping double backward converter including windings (Np, Ns), power MOS transistors ($S_1$, $S_2$) and diodes ($D_1$, $D_2$). The positive end of the winding (Np) is connected with the source end of the power MOS transistor ($S_1$), and the negative end of the winding (Np) is connected with the drain end of the power MOS transistor ($S_2$). The anode of the diode ($D_1$) is connected with the negative end of the winding (Np), and the cathode is connected with the drain end of the power MOS transistor ($S_1$). The anode of the diode ($D_2$) is connected with the source end of the power MOS transistor ($S_2$), and the cathode is connected with the positive end of the winding (Np). The delay driving circuit is connected, respectively, with the gates of the power MOS transistors ($S_1$), ($S_2$).

The converter is an active clamping double backward converter including windings (Np, Ns), power MOS transistors ($S_1$, $S_2$), a capacitor (Cc) and a power MOS transistor (Sc). The positive end of the winding (Np) is connected with the source of the power MOS transistor $S_1$), and the negative end of the winding (Np) is connected with the drain end of the power MOS transistor ($S_2$). The capacitor (Cc) and the power MOS transistor (Sc) are connected in serial, and then connected parallel the winding (Np), with its two ends connected with positive and negative ends of the winding (Np), respectively. The delay driving circuit is connected with the gates of the power MOS transistors ($S_1$) and ($S_2$), respectively.

The present invention utilizes certain small power resistance and capacitance elements, diodes, transistors or field effect transistors to realize the equivalent self-driving technology. Thus, it ensures the reliable turn-on and turn-off of SR1, and at the same time it ensures the minimum cross-conductive loss and high converting efficiency.

The present invention will be further explained through the following embodiments in conjunction with the accompanying drawings.

Figure 7A:
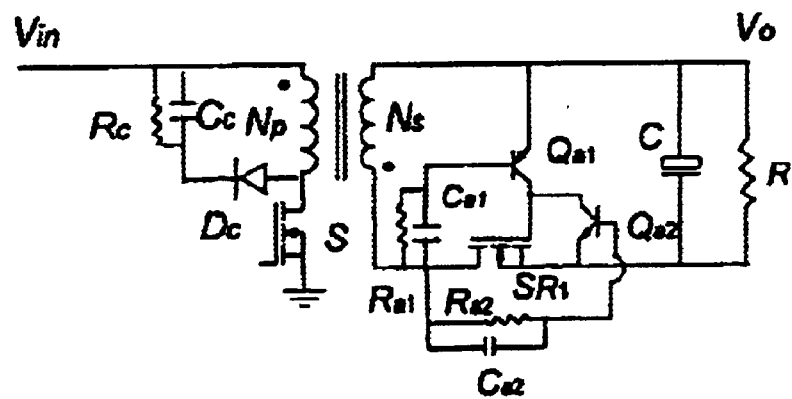
Figure 7B:
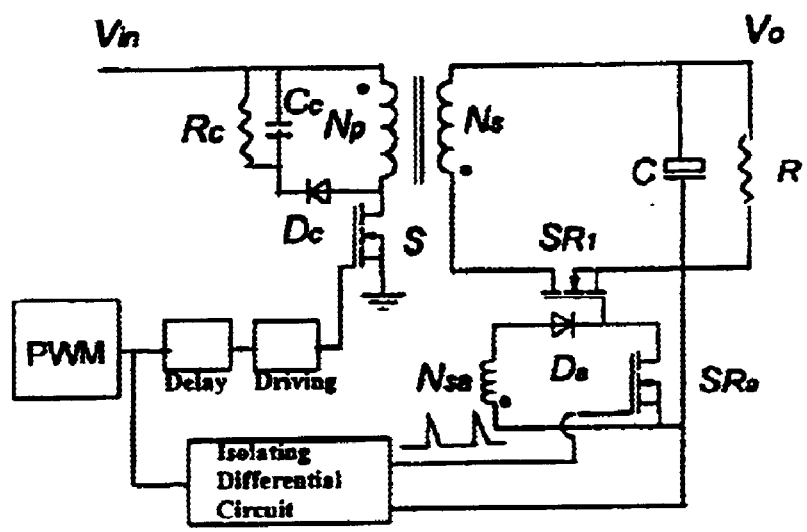
Figure 8A:
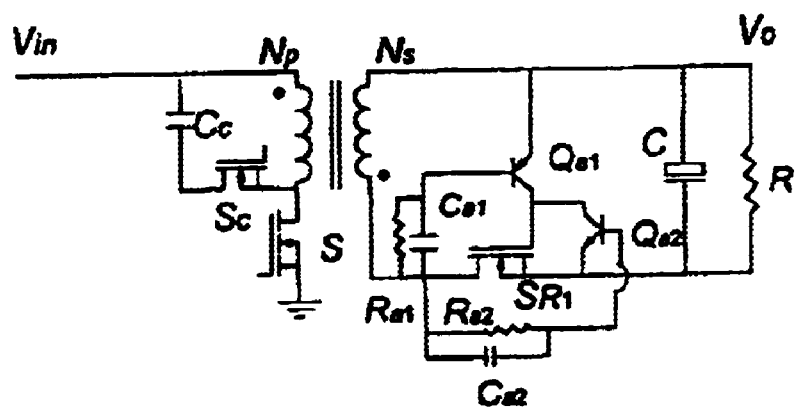
Figure 8B:
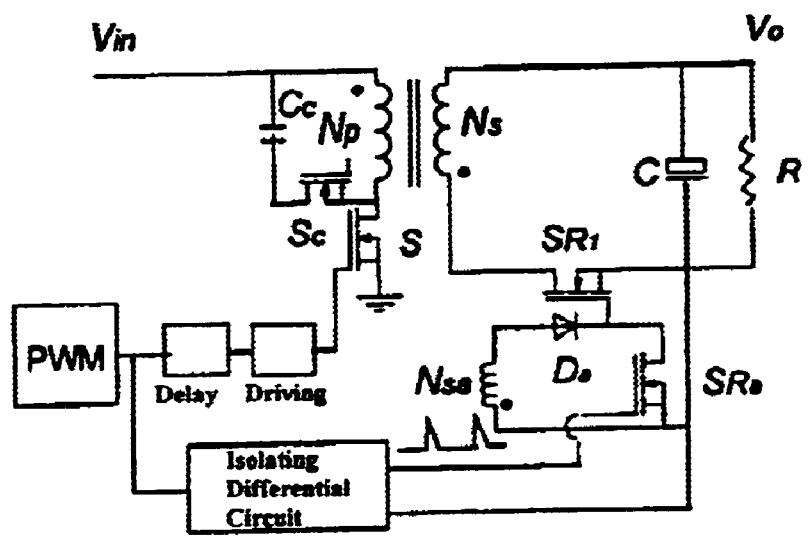
Figure 9A:
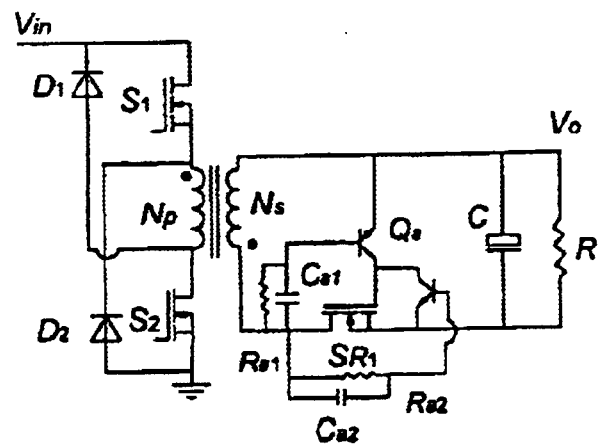
Figure 9B:
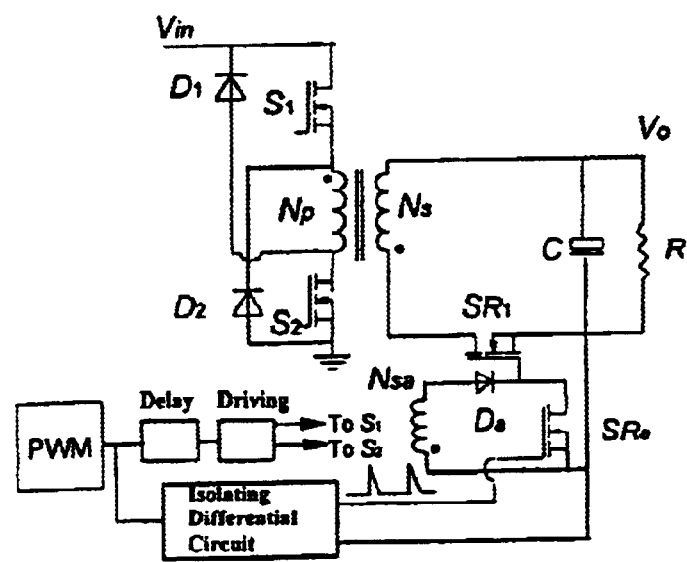
Figure 10A:
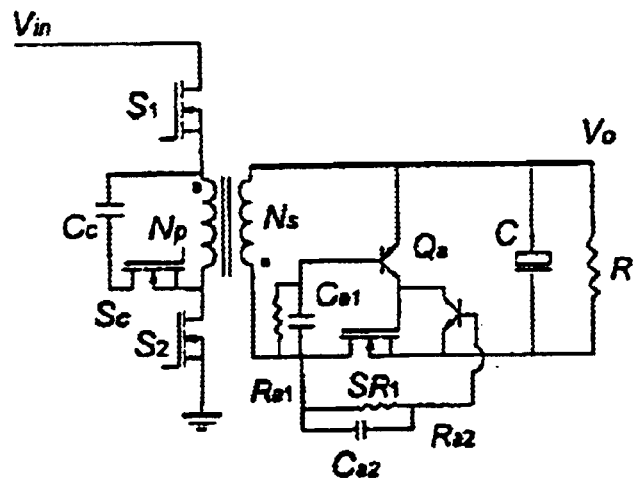
Figure 10B:
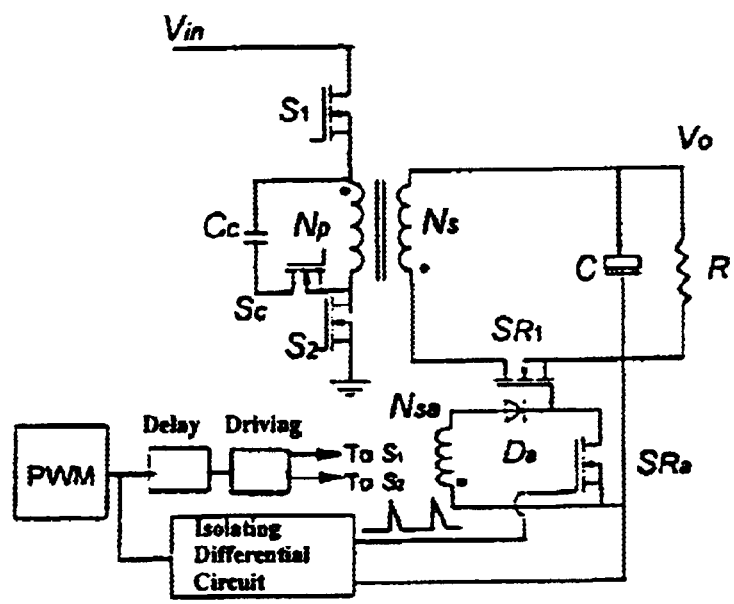
Figure 11:
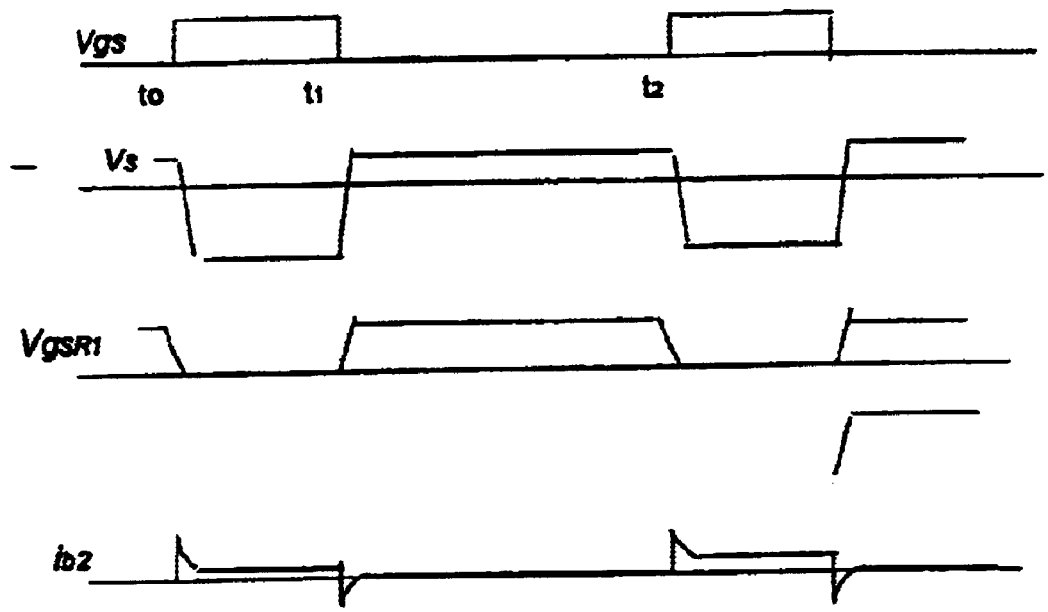
Figure 12:
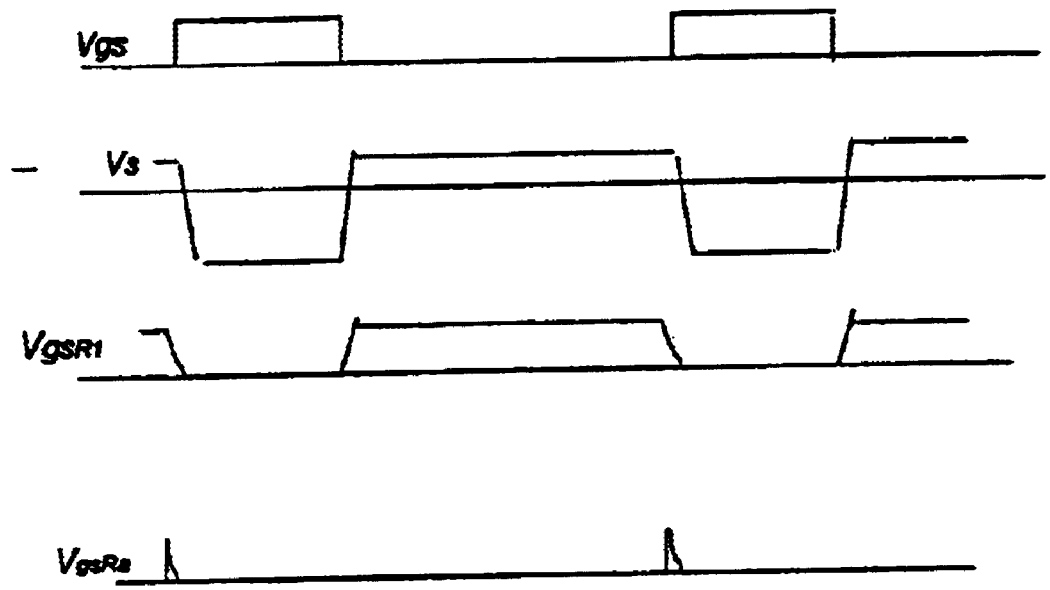

FIG. 7a is an embodiment of a R. C. D. clamping backward converter using the first self-driving circuit;

FIG. 7b is an embodiment of a R. C. D. clamping backward converter using the second self-driving circuit;

FIG. 8a is an embodiment of an active clamping backward converter using the first self-driving circuit;

FIG. 8b is an embodiment of an active clamping backward converter using the second self-driving circuit;

FIG. 9a is an embodiment of a diode clamping double backward converter using the first self-driving circuit;

FIG. 9b is an embodiment of a diode clamping double backward converter using the second self-driving circuit;

FIG. 10a is an embodiment of an active clamping double backward converter using the first self-driving circuit;

FIG. 10b is an embodiment of an active clamping double backward converter using the second self-driving circuit;

FIG. 11 shows a typical waveform of the converter using the driving circuit of FIG. 4 (a); and FIG. 12 shows a typical waveform of the converter using the driving circuit of FIG. 4 (b).

The operation principle of the two self-driving circuits of the present invention is explained hereinafter. FIG. 4 (a) is a non-isolating self-driving circuit of a normal backward converter. Windings Np and Ns are connected in a manner of non-identical names, the rectification portion of the converter comprises a synchronous rectifying MOS transistor $SR_1$. The self-driving circuit is composed of two resisters $R_{a1}$, $R_{a2}$, two capacitors $C_{a1}$, $C_{a2}$, a PNP transistor $Q_{a1}$ and a NPN transistor $Q_{a2}$. The configuration is as follows: the resister $R_{a1}$ and the capacitor $C_{a1}$ are connected in parallel, and an end of the parallel connection is connected with the base of the transistor $Q_{a1}$, and the other end thereof is connected with an end of the parallel connection of the register $R_{a2}$ and capacitor $C_{a2}$, and with the positive end of the transformer winding Ns and the drain end of the rectifying MOS transistor $SR_1$. The other end of the parallel connection of the resister $R_{a2}$ and capacitor $C_{a2}$ is connected with the base end of the transistor $Q_{a2}$. The emitter of the transistor $Q_{a2}$ is connected with the source end of the MOS transistor $SR_1$, while its collector is connected the collector of the transistor $Q_{a1}$ and the gate end of the MOS transistor SRI. The emitter of the transistor $Q_{a1}$ is connected with the negative end of the winding Ns.

Through $R_{a1}$, $C_{a1}$, and $Q_{a1}$, $SR_1$ may turn on after S turns off. Through $R_{a2}$, $C_{a2}$, and $Q_{a2}$, $SR_1$ remains off when S is on.

Figures 1A, 1B:
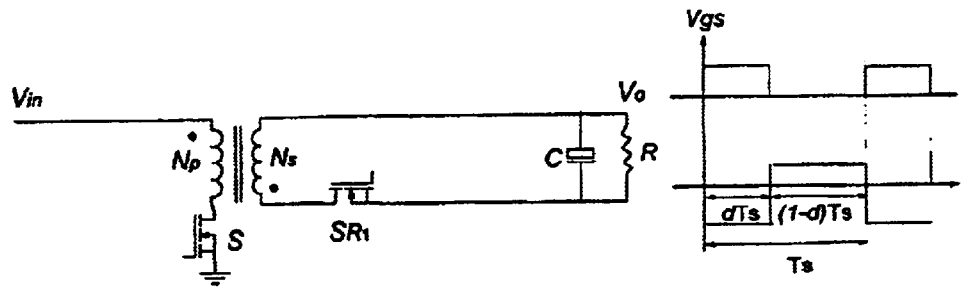
FIG. 1a is a normal backward converter circuit.
FIG. 1b is the waveform of the secondary side voltage of the above circuit.
Figure 2:
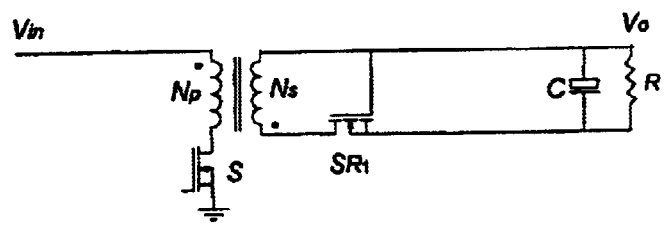
FIG. 2 is a direct self-driving circuit.
Figure 3:
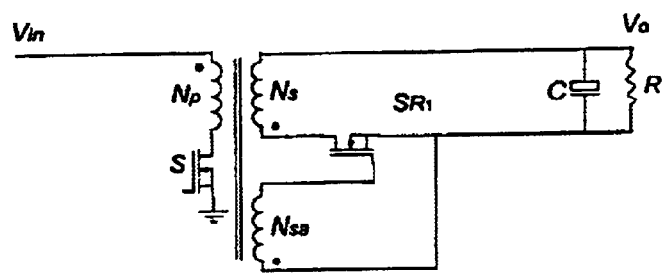
FIG. 3 is a known self-driving circuit.
Figure 4A:
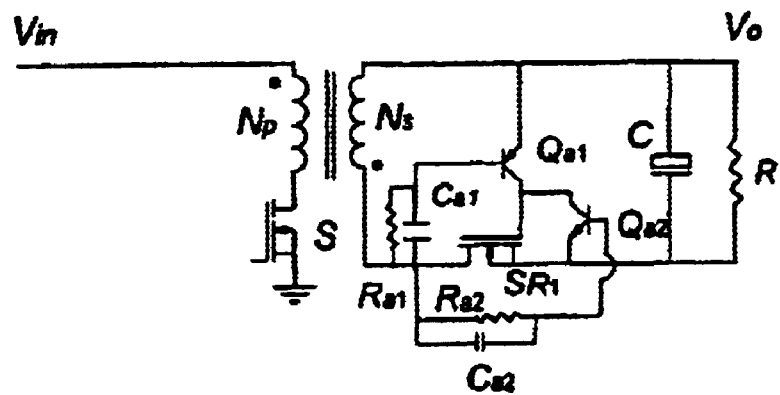
FIG. 4a is the first self-driving circuit of the present invention.

When the self-driving circuit of FIG. 4a is used, the typical operation waveform of various voltages and current of the converter is shown in FIG. 11.

At $t=t_1$, the main switch S turns off; at this time, the waveform of the secondary side voltage changes from positive at bottom and negative at top to positive at top and negative at bottom. $Q_{a1}$ turns on quickly through $R_{a1}$. and $C_{a1}$ $V_{aSR1}$ changes to $V_O$ so as to turn on $SR_1$, and the energy of the secondary side of the transformer is provided to the load through $SR_1$. At $t=t_2$, the main switch S turns on again. The waveform of the secondary side changes from to positive and bottom negative to top negative and bottom positive, and $Q_{a2}$ turns on quickly through $R_{a2}$, $C_{a2}$. $V_{gSR1}$ changes to zero so as to turn off $SR_1$, and the primary side of the transformer stores energy, and the capacitor C provides power to the load. The accelerate circuit formed of $R_{a2}$, $C_{a2}$ enables that $Q_{a2}$ turns on quicker than $SR_1$, so as to ensure the quick discharge of the gate voltage of $SR_1$. By simply carefully selecting $R_{a2}$, $C_{a2}$, it may dramatically reduce the cross-conductive loss between $SR_1$ and S to increase the converting efficiency. $R_{a2}$ and $C_{a2}$ can hardly be optimized when the frequency is relatively high because there is a storing time when $Q_{a2}$ turns off.

Accordingly, the switch frequency of such technology should be lower than 250kHz. When the switch frequency of the converter is relatively low, such technology may achieve very high converting efficiency.

Figure 4B:
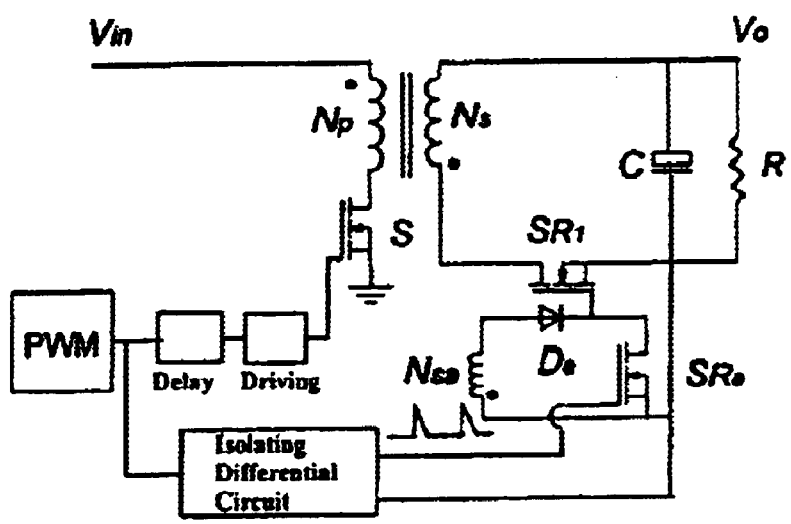
FIG. 4b is the second self-driving circuit of the present invention.

FIG. 4b is an isolating self-driving circuit of the normal backward converter. The circuit of FIG. 4b is to utilize an auxiliary winding Nsa, a diode Da, a small power MOSFET (SRa), a set of isolating pulse control circuit and a time delay driving circuit to accomplish the function of $R_{a1}$, $C_{a1}$, $Q_{a1}$ and $R_{a2}$, $C_{a2}$, $Q_{a2}$ of FIG. 4a. The rectification portion of the converter comprises a synchronous rectifying MOS transistor $SR_1$, and the self-driving circuit is composed of a diode Da, a small power MOS transistor SRa, an auxiliary winding Nsa, a delay driving circuit and an isolating differential circuit. The structure is as follows: the delay driving circuit and the isolating differential circuit are connected; an end of the isolating differential circuit is connected with the gate of the small power transistor SRa; the positive end of the auxiliary winding is connected with the source of the small power MOS transistor SRa, and the negative end is connected to the anode of the diode Da. The cathode of the diode Da is connected with the gate of the synchronous rectifying MOS transistor $SR_1$ and the drain end of the small power transistor SRa.

The function of the delay driving circuit is to let SR1 turn off a little bit earlier than the turn-on of S so as to control the best delay time interval and to increase the efficiency of the converter. The typical waveform thereof is shown in FIG. 12.

The turning-on of SR1 is realized by the external auxiliary winding Nsa and the diode Da, and the turning-off thereof is realized by a small power MOSFET Sa, a delay driving circuit and an isolating differential circuit. Through the delay driving circuit, SR1 is adjustably turned off before S turns on so as to minimize the cross-conductive loss and to maximize the efficiency of the converter. This circuit differs from FIG. 4a as follows: (1) addition of certain small auxiliary circuit (such as Da, Sa, a delay circuit and an isolating differential circuit); (2) adjustable dead region of the cross-conduction; (3) flexibility of optimization of power stage.

The advantage of this kind of self-driving circuit is more common, and has no restriction to the switch frequency of the converter. The disadvantage is the little complicated structure, and requires isolation. However, the size of the all of components is still small because only pulse is required to drive Sa.

The present invention uses some additional small power elements, such that the DC/DC converter of only one synchronous rectifying MOSFET (e.g., backward converter) may also use self-driving synchronous rectification technology.

Figure 5A:
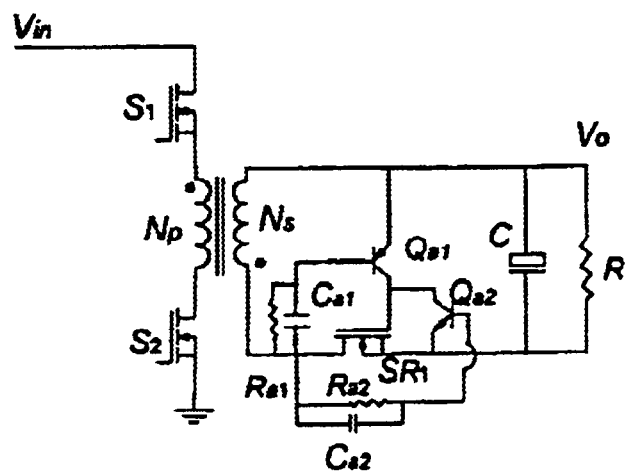
FIG. 5a is an embodiment of a double backward converter using the first self-driving circuit.
Figure 5B:
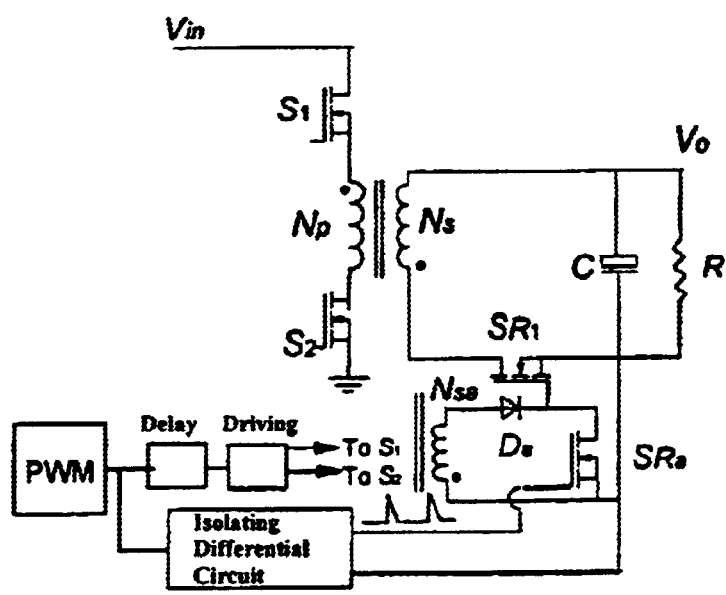
FIG. 5b is an embodiment of a double backward converter using the second self-driving circuit.

The two inventive technology of FIG. 4 can be broadly adopted. This can be seen in FIG. 5 to FIG. 10 for other embodiments. The advantages of them are described as follows:

FIG. 5 is the application of the two circuits of the present invention in a double backward stimulating circuit. The DC/DC converter includes windings Np, Ns and power MOS transistors $S_1$, $S_2$. The positive end of the winding Np is connected with the source end of the power MOS transistor $S_1$, and the negative end of the winding Np is connected with the drain of the power MOS transistor $S_2$. The delay driving circuit is connected, respectively, to the gate of the power MOS transistors $S_1$, $S_2$.

Figure 6A:
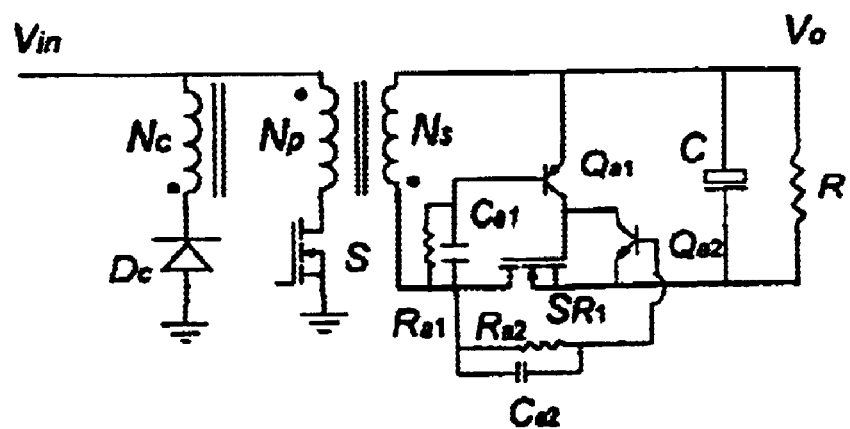
FIG. 6a is an embodiment of a three-winding clamping backward converter using the first self-driving circuit.
Figure 6B:
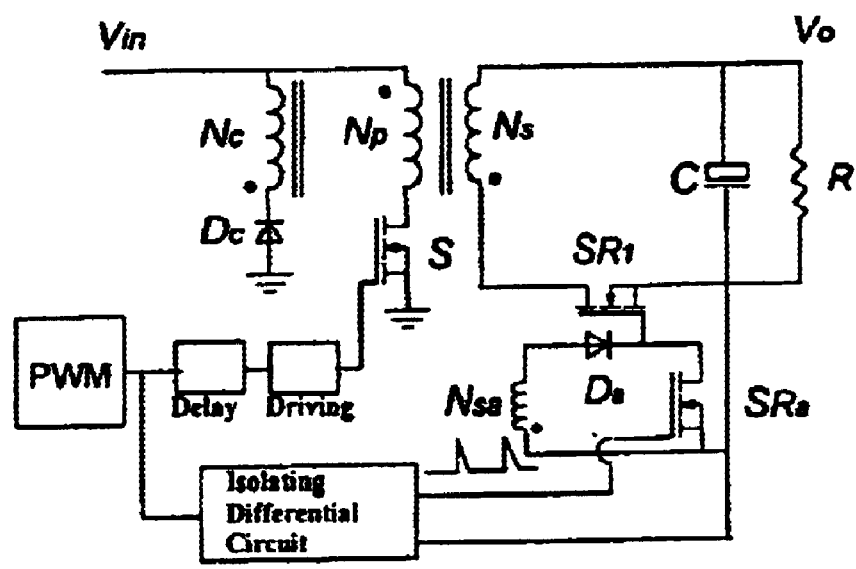
FIG. 6b is an embodiment of a three-winding clamping backward converter using the second self-driving circuit.

FIG. 6 to FIG. 8 are the applications of these two circuits of the present invention in backward converters of various clamping circuits. FIG. 6 is such an application in a three-winding clamping backward stimulating circuit. This three-winding (Nc, Np, Ns) clamping backward converter includes windings Np, Ns, Nc, a power MOS transistor S and a diode Dc. The negative end of the winding Np is connected with the drain of the power MOS transistor S, and the positive end of the winding Nc is connected with the cathode of the diode Dc. The delay driving circuit is connected with the gate of the power MOS transistors.

FIG. 7 is such an application in a R.C.D. clamping backward stimulating circuit. The R.C.D. clamping backward converter includes windings Np, Ns, a power MOS transistor S, a resister Rc, a diode Dc and a capacitor Cc. The negative end of the winding Np is connected with the drain end of the power MOS transistor S. The delay driving circuit is connected with the gate end of the power MOS transistor S, and the negative end of the winding Np is connected with the anode of the diode Dc. An end of parallel-connected capacitor Cc and resister Rc is connected with the cathode of the diode Dc, and the other end is connected with the positive end of the winding Np.

FIG. 8 is such an application in an active clamping backward stimulating circuit. The active clamping backward converter includes windings Np, Ns, power MOS transistors S, Sc and a capacitor Cc. The positive end of the winding Np is connected through the capacitor Cc with the drain end of the power MOS transistor Sc. The source end of the power MOS transistor Sc is connected with the drain end of the power MOS transistor S and the negative end of the winding Np. The delay driving circuit is connected with the gate of the power MOS transistor S.

FIG. 9–FIG. 10 are the applications of these two self-driving circuits of the present invention in double backward stimulating circuit various claiming circuits. FIG. 9 is such an application in a diode clamping double backward circuit. The diode clamping double backward converter includes windings Np, Ns, power MOS transistors $S_1$, $S_2$ and diodes $D_1$, $D_2$. The positive end of the winding Np is connected with the source end of the power MOS transistor $S_1$, and the negative end of the winding Np is connected with the drain end of the power MOS transistor $S_2$. The anode of the diode $D_1$ is connected with the negative end of the winding Np, and the cathode is connected with the drain end of the power MOS transistor $S_1$. The anode of the diode ($D_2$) is connected with the source end of the power MOS transistor ($S_2$), and the cathode is connected with the positive end of the winding (Np). The delay driving circuit is connected, respectively, with the gates of the power MOS transistors $S_1$, $S_2$.

FIG. 10 is such an application in an active clamping double backward stimulating circuit. The active clamping double backward converter includes windings Np, Ns, power MOS transistors $S_1$, $S_2$, a capacitor Cc and a power MOS transistor Sc. The positive end of the winding Np is connected with the source end of the power MOS transistor $S_1$, and the negative end of the winding Np is connected with the drain end of the power MOS transistor $S_2$. The capacitor Cc and the power MOS transistor Sc are connected in serial, and then connected parallel with the winding Np, with its two ends connected with positive and negative ends of the winding Np, respectively. The delay driving circuit is connected with the gates of the power MOS transistors $S_1$, $S_2$, respectively.

The two self-driving circuit of the present invention have been proved through experiments. The first embodiment has been used in a DC/DC power supply (using a three-winding clamping backward circuit) of 40–60V direct current input, and 1.2–1.65V@35A direct current output. The efficiency of the power stage reaches 84%. The second embodiment has been used in a DC/DC power supply (using a three-winding clamping backward circuit) of 36–72V direct current input and 5V@30A direct current output. The efficiency of the power stage reaches 90%.

The present invention has been explained through the embodiments. However, the present invention is not limited thereto. Any improvement and substitution should be viewed within the scope of the protection of the present invention provided that they are not apart from the spirits and contents of the present invention.

What is claimed is:

1. A self-driving circuit of a DC/DC converter having a transformer and a rectification portion, said rectification portion including at least a synchronous rectifying MOS transistor, characterized in that the self-driving circuit comprises a first and a second resisters, a first and a second capacitors, a PNP transistor and a NPN transistor; the first resister and the first capacitor being connected in parallel, and an end of the parallel connection being connected with the base of said PNP transistor, and the other end of the parallel connection connected with an end of parallel connected the second resister and the second capacitor, and connected with the positive end of the transformer secondary winding and the drain end of the synchronous rectifying transistor; the other end of said parallel connection of the second resister and second capacitor being connected with the base end of said NPN transistor; the emitter of said NPN transistor being connected with the source end of the synchronous rectifying transistor, while the collector of said NPN transistor is connected with the collector of said PNP transistor; the emitter of said PNP transistor being connected with the negative end of said transformer secondary winding.

2. The self-driving circuit of claim 1, characterized in that said DC/C converter is a double backward converter, the positive end of the primary winding of said transformer being connected with the source end of a first power MOS transistor, and the negative end of the primary winding of said transformer being connected to the drain end of a second power MOS transistor.

3. The self-driving circuit of claim 1, characterized in that said DC/DC converter is a three-winding clamping backward converter, including a first, a second, and a third windings, a power MOS transistor and a diode, the negative end of the first winding being connected with the drain end of the power MOS transistor, and the positive end of the second winding connected with the cathode of said diode, and the third winding being the secondary winding of said transformer.

4. The self-driving circuit of claim 1, characterized in that said DC/DC converter is a R.C.D. clamping backward converter, including a first winding and a second winding, a power MOS transistor, a resister, a diode and a capacitor, the negative end of the first winding being connected with the drain end of the power MOS transistor, and with the anode of said diode, an end of parallel-connected said capacitor and said resister being connected with the cathode of said diode, while the other end of the parallel connection is connected with the positive end of the first winding, said second winding being the secondary winding of said transformer.

5. The self-driving circuit of claim 1, characterized in that said DC/DC converter is an active clamping backward converter, including a first and a second windings, a first and a second power MOS transistors and a capacitor, the positive end of said first winding being connected through said capacitor with the drain end of the second power MOS transistor, the source end of the second power MOS transistor being connected with the drain end of the first power MOS transistor and the negative end of the first winding, and said second winding being the secondary winding of said transformer.

6. The self-driving circuit of claim 1, characterized in that said converter is a diode clamping double backward converter, including a first and a second windings, a first and a second power MOS transistors and a first and a second diodes, the positive end of the first winding being connected with the source end of the first power MOS transistor, and the negative end of the first winding connected with the drain end of the second power MOS transistor, the anode of the first diode being connected with the negative end of the first winding, and its cathode connected with the drain of the first power MOS transistor, the anode of the second diode being connected with the source end of the second power MOS transistor, and its cathode connected with the positive end of the first winding, and said second winding being the secondary winding of said transformer.

7. The self-driving circuit of claim 1, characterized in that said converter is an active clamping double backward converter, including a first and a second windings, a first and a second power MOS transistors, a capacitor and a third power MOS transistor, the positive end of the first winding being connected with the source of the first power MOS transistor, and the negative end of the first winding connected with the drain end of the second power MOS transistor, the capacitor and the third power MOS transistor being connected in serial, and then connected parallel with the first winding, with its two ends connected with positive and negative ends of the first winding, respectively, and said second winding being the secondary winding of said transformer.

8. The self-driving circuit of claim 2, characterized in that said DC/DC converter is a double backward converter, the positive end of the primary winding of said transformer being connected with the source end of a first power MOS transistor, and the negative end of the primary winding of said transformer being connected to the drain end of a second power MOS transistor.

9. A self-driving circuit for a DC/DC converter having a transformer and a rectification portion, said rectification portion including a synchronous rectifying MOS transistor, characterized in that the self-driving circuit comprises a diode, a small power MOS transistor, an auxiliary winding, a time delay driving circuit, and an isolating differential circuit, said time delay driving circuit and said isolating differential circuit being connected with each other; the other end of said isolating differential circuit being connected with the gate of the small power MOS transistor; the positive end of the auxiliary winding being connected with the source end of the small power MOS transistor, while its negative end is connected with the anode of the diode, the cathode of said diode being connected with the gate of the synchronous rectifying MOS transistor and the drain end of the small power transistor.

10. The self-driving circuit of claim 9, characterized in that said DC/DC converter is a double backward converter, the positive end of the primary winding of said transformer being connected with the source end of a first power MOS transistor, and the negative end of the primary winding of said transformer being connected to the drain end of a second power MOS transistor, the gates of said first and second power MOS transistors being connected to the time delay driving circuit respectively.

11. The self-driving circuit of claim 10, characterized in that said synchronous rectifying MOS transistor turns off before the first power MOS transistor, connected to the primary side of said transformer, turns on.

12. The self-driving circuit of claim 9, characterized in that said DC/DC converter is a three-winding clamping backward converter, including a first, a second, and a third windings, a power MOS transistor and a diode, the negative end of the first winding being connected with the drain end of the power MOS transistor, and the positive end of the second winding connected with the cathode of said diode, the gate of said power MOS transistor connected with said time delay driving circuit, and the third winding being the secondary winding of said transformer.

13. The self-driving circuit of claim 9, characterized in that said DC/DC converter is a R.C.D. clamping backward converter, including a first winding and a second winding, a power MOS transistor, a resister, a diode and a capacitor, the negative end of the first winding being connected with the drain end of the power MOS transistor, and with the anode of said diode, the gate of said power MOS transistor connected with said time delay driving circuit, an end of parallel-connected said capacitor and said resister being connected with the cathode of said diode, and the other end of the parallel connection being connected with the positive end of the first winding, said second winding being the secondary winding of said transformer.

14. The self-driving circuit of claim 9, characterized in that said DC/DC converter is an active clamping backward converter, including a first and a second windings, a first and a second power MOS transistors and a capacitor, the positive end of said first winding being connected through said capacitor with the drain end of the second power MOS transistor, the source end of the second power MOS transistor being connected with the drain end of the first power MOS transistor and the negative end of the first winding, said time delay driving circuit connected with the gate of said power MOS transistor, and said second winding being the secondary winding of said transformer.

15. The self-driving circuit of claim 9, characterized in that said converter is a diode clamping double backward converter, including a first and a second windings, a first and a second power MOS transistors and a first and a second diodes, the positive end of the first winding being connected with the source end of the first power MOS transistor, and the negative end of the first winding connected with the drain end of the second power MOS transistor, the anode of the first diode being connected with the negative end of the first winding, and its cathode connected with the drain of the first power MOS transistor, the anode of the second diode being connected with the source end of the second power MOS transistor, and its cathode connected with the positive end of the first winding, said time delay driving circuit being connected, respectively, with the gates of said first and second power MOS transistor, and said second winding being the secondary winding of said transformer.

16. The self-driving circuit of claim 9, characterized in that said converter is an active clamping double backward converter, including a first and a second windings, a first and a second power MOS transistors, a capacitor and a third power MOS transistor, the positive end of the first winding being connected with the source of the first power MOS transistor, and the negative end of the first winding connected with the drain end of the second power MOS transistor, the capacitor and the third power MOS transistor being connected in serial, and then connected parallel with the first winding, two ends of the parallel connection being connected with positive and negative ends of the first winding, respectively, said time delay driving circuit being connected, respectively, with the gates of said first and second power MOS transistors, and said second winding being the secondary winding of said transformer.

17. The self-driving circuit of claim 9, characterized in that the time delay driving circuit includes a delay circuit and a driving circuit, wherein the delay circuit is formed by connecting the diode and resister in parallel and then connected in serial to a ground capacitor.

\* \* \* \* \*